United States Patent [19]
Jamrus et al.

[11] Patent Number: 5,131,510
[45] Date of Patent: Jul. 21, 1992

[54] BRAKE ASSEMBLY FOR A CONTROL ROD DRIVE

[75] Inventors: Kenneth J. Jamrus; Richard A. Ose, both of San Jose, Calif.

[73] Assignee: General Electric Company, San Jose, Calif.

[21] Appl. No.: 559,743

[22] Filed: Jul. 30, 1990

[51] Int. Cl.$^5$ .................................. B60T 13/04
[52] U.S. Cl. .................... 188/171; 74/89.15; 74/424.8 R; 188/67; 188/82.9; 376/232; 376/235; 376/242
[58] Field of Search ............ 188/82.9, 82.3, 82.34, 188/82.4, 30, 61, 67, 171, 173; 74/424.8 R, 424.8 VA, 89.15; 376/232, 233, 235, 242

[56] References Cited

U.S. PATENT DOCUMENTS

| | | | |
|---|---|---|---|
| 624,239 | 5/1899 | Norton | 188/82.3 |
| 1,373,077 | 3/1921 | Johnston | 188/30 |
| 1,810,998 | 6/1931 | Bjork | 188/30 |
| 1,827,720 | 10/1931 | Lamb | 188/30 |
| 2,080,544 | 5/1937 | Naugler | 192/148 |
| 2,949,172 | 8/1960 | Simons | 188/171 |
| 3,258,985 | 7/1966 | Jordon | 74/424.8 R |
| 3,410,381 | 11/1968 | Henshaw et al. | 192/148 |
| 3,785,923 | 1/1974 | Bratoljic et al. | 376/227 |
| 3,945,514 | 3/1976 | Dose | 214/27 |
| 4,015,696 | 4/1977 | Lichti | 188/189 |
| 4,119,310 | 10/1978 | Trubody | 188/82.9 X |
| 4,238,288 | 12/1980 | Anikin et al. | 176/36 R |
| 4,423,002 | 12/1983 | Wiart et al. | 376/227 |
| 4,481,864 | 11/1984 | Peruzzi | 188/82.34 X |
| 4,518,559 | 5/1985 | Fisher et al. | 376/230 |
| 4,624,825 | 11/1986 | Martin et al. | 376/227 |
| 4,661,307 | 4/1987 | Guillot | 376/232 |
| 4,827,782 | 5/1989 | Torii et al. | 74/89.15 |
| 4,987,788 | 1/1991 | Bausch | 74/89.15 |

FOREIGN PATENT DOCUMENTS

| | | |
|---|---|---|
| 0093055 | 11/1983 | European Pat. Off. |
| 0305719 | 3/1989 | European Pat. Off. |
| 1223070 | 8/1966 | Fed. Rep. of Germany |

Primary Examiner—George A. Halvosa
Attorney, Agent, or Firm—Robert R. Schroeder

[57] ABSTRACT

A brake assembly is disclosed for selectively preventing rotation of a shaft, such as a shaft used in a control rod drive for a nuclear reactor. The brake assembly includes a stationary base, a rotor disc fixedly connected to the shaft for rotation therewith, and a brake member disposed adjacent to the rotor disc. The rotor disc includes at least one rotor tooth and the brake member includes at least one braking tooth. The member is selectively positionable in a deployed position for allowing the braking tooth to contact the rotor tooth for preventing rotation of the shaft in a first direction while permitting roation in the opposite direction, and in a retracted position for allowing the rotor disc and shaft to rotate in either direction without restraint from the brake member.

3 Claims, 3 Drawing Sheets

BRAKE ASSEMBLY FOR A CONTROL ROD DRIVE

Technical Field

The present invention relates generally to control rod drives used in nuclear reactors and, more specifically, to a brake assembly effective for preventing rotation of the control rod drive when engaged.

BACKGROUND ART

In one type of nuclear reactor, control rods are selectively inserted and withdrawn from a nuclear reactor vessel for controlling the operation thereof. Each of the control rods is typically positioned by a conventional control rod drive which includes a ball screw or spindle operatively engaging a ball nut for raising and lowering the ball nut as the spindle is rotated either clockwise or counterclockwise. A hollow piston rests upon the ball nut at one end thereof and at its other end is conventionally joined to the control rod. Displacement of the ball nut provides displacement of the piston which in turn inserts or withdraws the control rod in the reactor vessel.

In order to achieve faster insertion of the control rod than could be obtained by normal rotation of the ball spindle, which is conventionally referred to as a scram operation, a rapid flow of high-pressure water is injected through the control rod drive past the piston for lifting the piston off the ball nut in a relatively short time for quickly inserting the control rod into the reactor vessel. The high-pressure water is channeled to the control rod drive through a scram line pipe attached to a high-pressure water accumulator.

In one type of occurrence which allows for rapid backflow of the water past the piston, due to, for example, a break in the scram line, the backflow may cause a large reverse pressure on the piston which in turn provides a back force on the control rod ball nut. This back force can cause reverse rotation of the ball spindle with corresponding withdrawal of the control rod. Withdrawal of one of the control rods due to such a backflow occurrence may cause damage to adjacent fuel in the reactor vessel, requiring replacement thereof leading to undesirable down time of the reactor and economic losses.

In order to prevent the above occurrence, a conventional electromechanical brake is provided in the control rod drive for holding the ball spindle from rotating unless the brake is energized. The brake is sized for restraining rotation of the ball spindle against such forces due to backflow of water over the piston when the control rod drive motor is not operating. And, when the control rod drive motor is operating, the motor itself is sized for providing adequate torque for resisting the forces due to the backflow of water in the event of the above-described occurrence.

To ensure operability of the brake, the brake is periodically tested. However, the brakes are located adjacent to the reactor vessel, which is inaccessible during operation of the reactor due to the radiation field emanating from the reactor vessel. The radiation field continues at reduced levels also during shutdown of the reactor, which would require inspectors to wear suitable protective clothing and limit their time in the area. In one nuclear reactor embodiment, there are about 205 control rod drives, including a respective number of brakes, which would necessarily require a substantial amount of time for testing all of the brakes. Testing of the brakes during reactor shutdown would, therefore, be relatively costly to accomplish, which is additionally economically undesirable since the reactor is not operating for producing power.

Since conventional electromechanical brakes typically utilize braking pads for restraining rotation of a rotor disc, they are subject to slippage. Slippage can result in undesirable partial withdrawal of the control rod during backflow occurrence, and also requires additional means for effectively testing the torque-resisting capability of the brake.

OBJECTS OF THE INVENTION

Accordingly, one object of the present invention is to provide a new and improved brake assembly for preventing rotation of a shaft.

Another object of the present invention is to provide a brake assembly effective for providing a positive rotational restraint of the shaft in one direction while allowing rotation thereof in an opposite direction.

Another object of the present invention is to provide a relatively simple and compact brake assembly for a shaft.

Another object of the present invention is to provide a brake assembly which is relatively easily testable.

Another object of the present invention is to provide a brake assembly for preventing rotation of a control rod drive for a nuclear reactor and which may be actuated and tested remotely.

DISCLOSURE OF INVENTION

A brake assembly is disclosed for selectively preventing rotation of a shaft, such as a shaft used in a control rod drive for a nuclear reactor. The brake assembly includes a stationary base, a rotor disc fixedly connected to the shaft for rotation therewith, and a brake member disposed adjacent to the rotor disc. The rotor disc includes at least one rotor tooth and the brake member includes at least one braking tooth. Means are disclosed for selectively positioning the brake member in a deployed position for allowing the braking tooth to contact the rotor tooth for preventing rotation of the shaft in a first direction, and in a retracted position for allowing the rotor disc and shaft to rotate without restraint from the brake member.

BRIEF DESCRIPTION OF DRAWINGS

The novel features believed characteristic of the invention are set forth and differentiated in the claims. The invention, in accordance with a preferred and exemplary embodiment, together with further objects and advantages thereof, is more particularly described in the following detailed description taken in conjunction with the accompanying drawing in which:

MODE(S) FOR CARRYING OUT THE INVENTION

Figure 1:
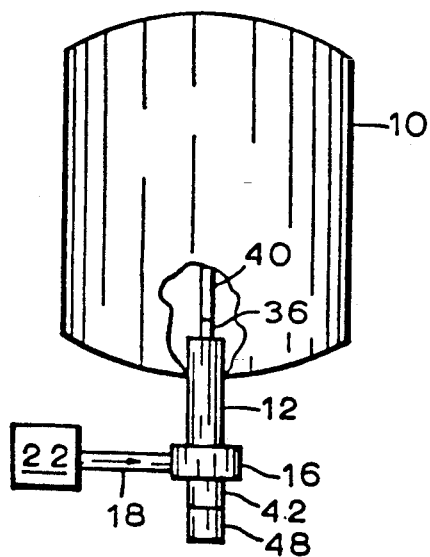
FIG. 1 is a schematic representation of a nuclear reactor vessel including a control rod drive having a brake assembly in accordance with one embodiment of the present invention.
Figure 2:
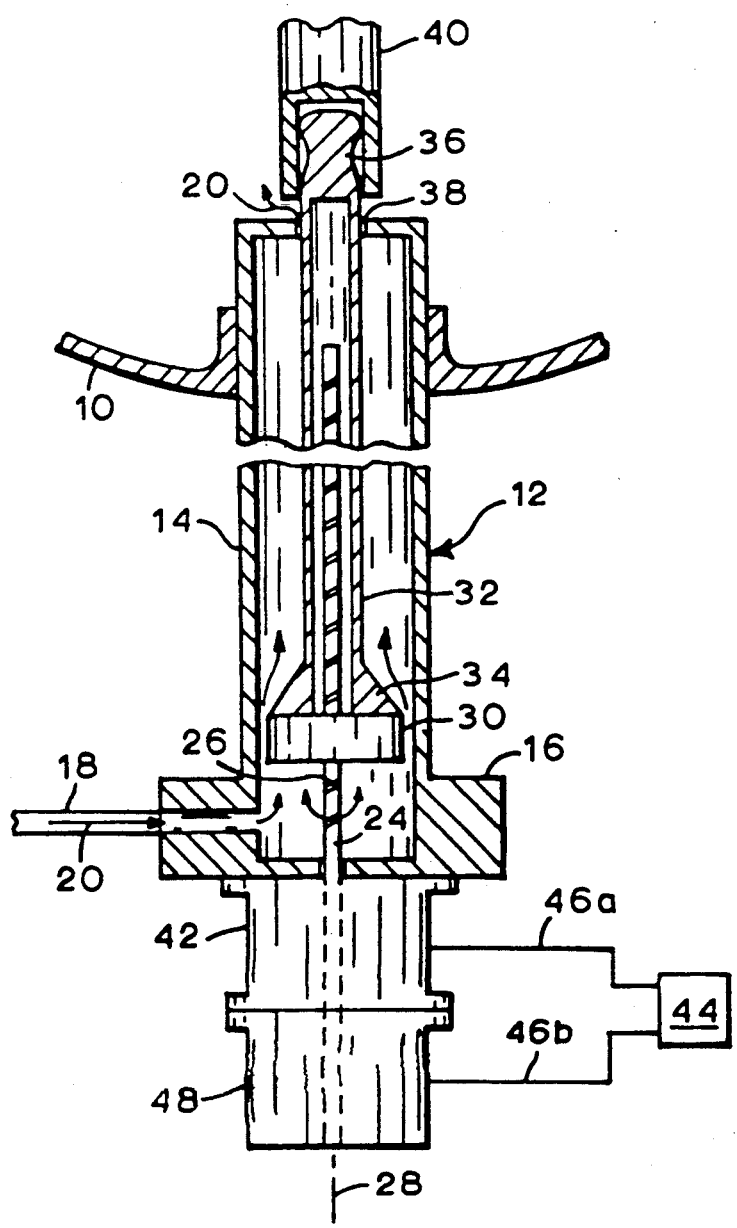
FIG. 2 is an enlarged sectional view, partly schematic, of the control rod drive illustrated in FIG. 1.

Illustrated in FIG. 1 is an exemplary nuclear reactor vessel 10 having a plurality of fine motion control rod drives 12 (FMCRD), only one of which is shown. In one exemplary embodiment, there are 205 FMCRDs 12 extending into the vessel 10 through the bottom thereof. Referring also to FIG. 2, an enlarged, sectional view of one of the control rod drives 12 is illustrated. The rod drive 12 includes a tubular housing 14 extending outwardly from the vessel 10 and conventionally secured thereto. The housing 14 is conventionally connected to a manifold 16 which is disposed in flow communication with a scram line or conduit 18 which is conventionally selectively provided with high-pressure water 20 from a conventional high-pressure water accumulator 22 conventionally joined to the scram line 18.

Conventionally disposed inside the housing 14 is a conventional ball screw or spindle 24, which in this exemplary embodiment includes conventional righthanded threads 26. The control rod drive 12 includes a longitudinal centerline axis 28, with the housing 12 and spindle 24 being disposed coaxially therewith.

A conventional ball nut 30 is positioned over the spindle 24 and is conventionally restrained from rotating therewith so that as the spindle is rotated in a clockwise direction, the ball nut is translated in a downward direction away from the vessel 10, and when the spindle is rotated in a counterclockwise direction, the ball nut 30 is translated in an upward direction toward the vessel 10. A conventional hollow, elongate piston 32 is disposed coaxially with the spindle 24 and includes a conical base end 34 which rests on the ball nut 30, and a tip end 36 extending through a central aperture 38 in the outer end of the housing 14 into the vessel 10. The tip end 36 is conventionally coupled to a respective control rod 40 by a bayonet coupling, for example.

The spindle 24 extends downwardly from the manifold 16 through a conventional electrical motor 42 which selectively rotates the spindle 24 in either the clockwise direction or counterclockwise direction. The motor 42 is electrically connected to a conventional control 44 by a conventional electrical line 46a for selectively controlling operation of the motor 42.

In accordance with the preferred embodiment of the present invention, the rod drive 12 further includes a brake assembly 48 joined to the motor 42 into which extends the spindle 24, also referred to as an input shaft 24. The brake assembly 48 is electrically joined to the control 44 by a conventional electrical line 46b for selectively braking and unbraking, or releasing, the input shaft 24.

Figure 3:
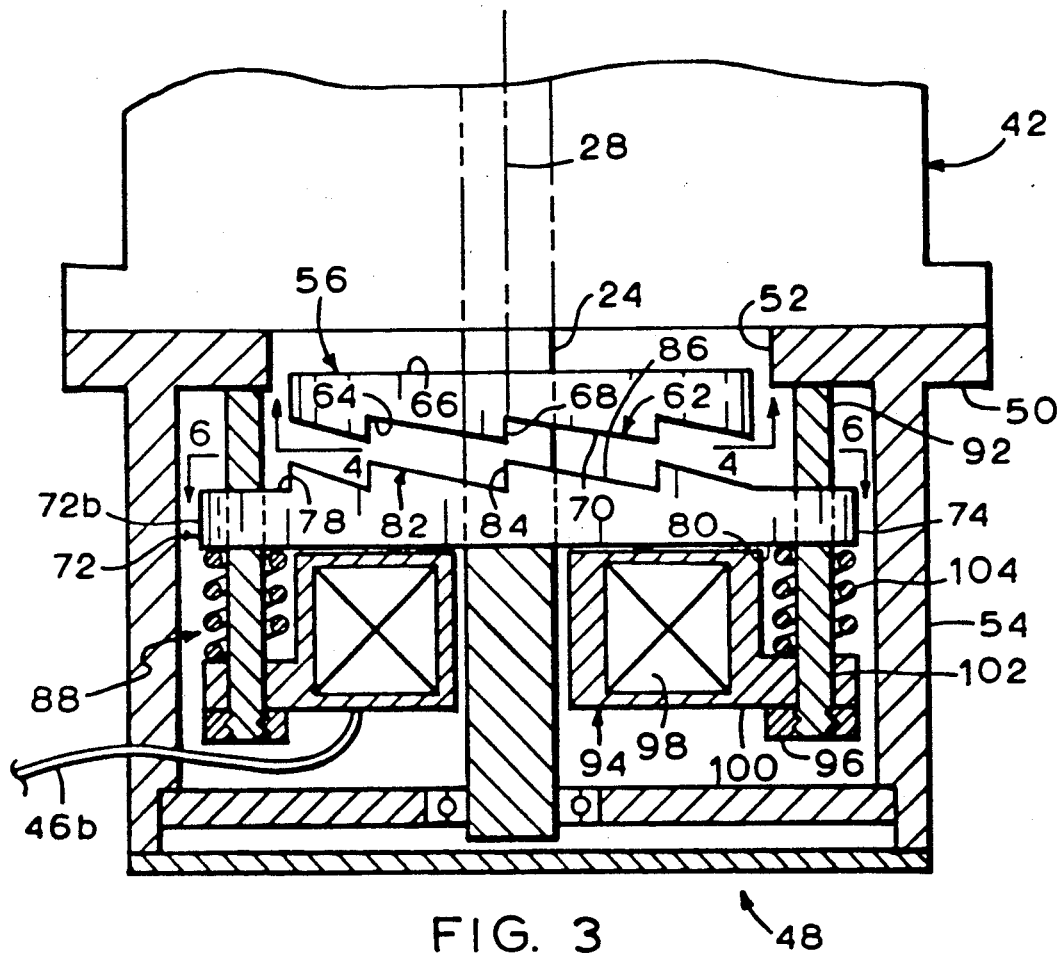
FIG. 3 is a longitudinal transverse partly sectional view of the brake assembly illustrated in FIGS. 1 and 2 in accordance with one embodiment of the present invention with a brake member disposed in a retracted position.

As illustrated in more particularity in FIG. 3, the brake assembly 48 includes an annular stationary base 50 conventionally fixedly secured to the motor 42, for example by bolts (not shown). The base 50 includes a central aperture 52 which receives a portion of the shaft 24 extending from the motor 42. Disposed coaxially with the shaft centerline axis 28 is an annular housing 54 of the brake assembly 48 which is conventionally fixedly secured to the base 50.

Figure 4:
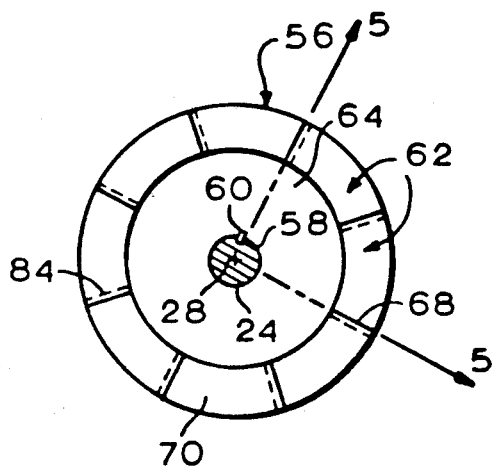
FIG. 4 is a transverse sectional view of the brake assembly illustrated in FIG. 3 taken along line 4—4.

The brake assembly 48 further includes an annular rotor disc 56 having a central aperture 58, as shown in more detail in FIG. 4, surrounding the shaft 24 and fixedly connected to the shaft 24 for rotation therewith by a conventional key 60. The rotor disc 56 has at least one and preferably a plurality of rotor teeth 62 extending circumferentially around the rotor disc 56 and extending outwardly from a first surface 64 of the rotor disc 56. An opposite, second surface 66 of the rotor disc 56 faces the motor 42.

Figure 5:
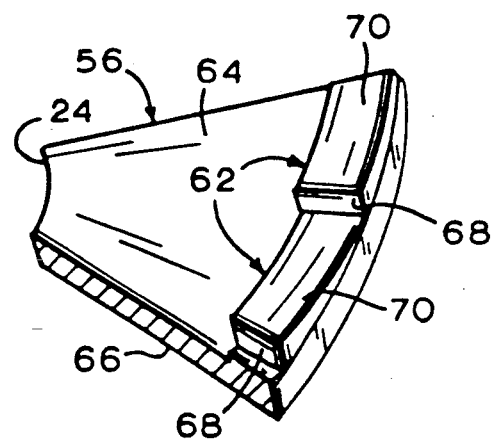
FIG. 5 is a perspective view of a portion of the rotor disc illustrated in FIG. 4 taken along line 5—5.

As illustrated in FIGS. 3–5, each of the rotor teeth 62 includes a locking surface 68 which extends generally perpendicularly outwardly from the first surface 64 and generally parallel to the centerline axis 28 and also in a radial direction relative to the shaft centerline axis 28 as illustrated more particularly in FIGS. 4 and 5. Each rotor tooth 62 further includes an inclined surface 70 extending from the first surface 64 to the outer end of the locking surface 68 in the circumferential direction. The locking surface 68 and the inclined surface 70 define a generally sawtooth profile for the rotor tooth 62.

Figure 6:
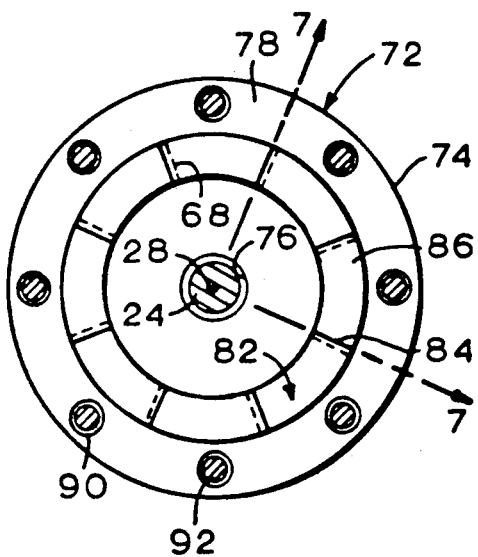
FIG. 6 is a transverse sectional view of the brake assembly illustrated in FIG. 3 taken along line 6—6.
Figure 7:
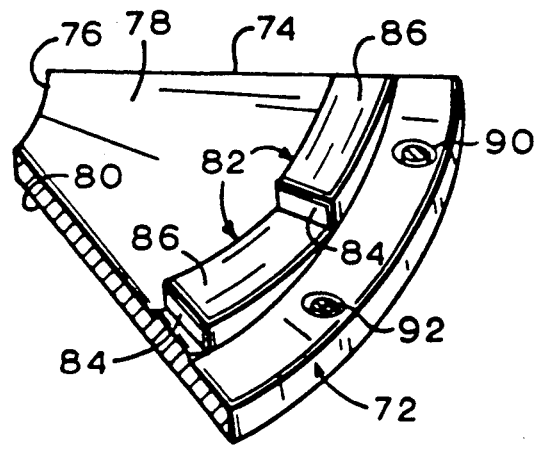
FIG. 7 is a perspective view of a portion of the brake member illustrated in FIG. 6 taken along line 7—7.

A nonrotating brake member 72 as shown in FIGS. 3, 6 and 7 is disposed adjacent to the rotor disc 56 and includes an annular base 74 having a central aperture 76 receiving the shaft 24 for rotation relative thereto. The brake member 72 includes a first surface 78 facing the rotor disc first surface 64, and a second, planar surface 80 facing away from the rotor disc 56. At least one and preferably a plurality of braking teeth 82 are formed integrally with the base 74 and extend outwardly from the first surface 78. Each of the braking teeth 82 has a sawtooth profile complementary to the rotor teeth 62 including a locking surface 84 extending outwardly from the first surface 78 as illustrated in more particularity in FIGS. 3 and 7 and generally parallel to the shaft longitudinal axis 28 and also in a radial direction relative to the shaft centerline axis 28. Each of the braking teeth 82 also includes an inclined surface 86 extending outwardly from the first surface 78 to the outer end of the locking surface 84 and extends in a circumferential direction at a radial position equal to the radial position of the rotor teeth 62 relative to the centerline axis 28 so that the rotor and braking teeth 62 and 82 face each other.

Figure 8:
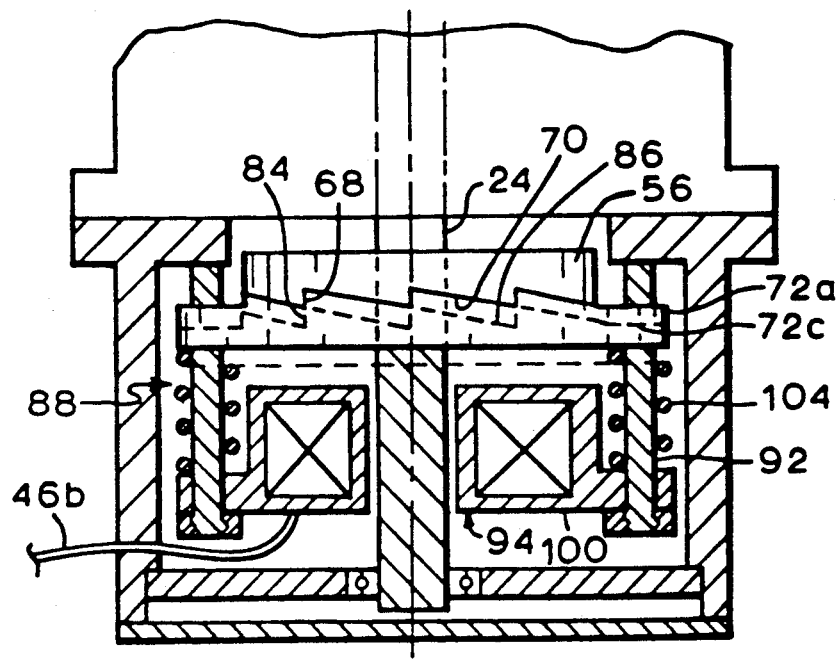
FIG. 8 is a longitudinal transverse partly sectional view of the brake assembly illustrated in FIGS. 1 and 2 shown with the brake member disposed in a deployed position.

Referring to FIGS. 3 and 8, the brake assembly 48 further includes means 88 for selectively positioning the brake member 72 in a deployed, locking position designated 72a, as shown in FIG. 8, for allowing the braking teeth 82 to mesh with the rotor teeth 62 with the braking teeth locking surfaces 84 contacting the rotor teeth locking surfaces 68 for preventing rotation of the shaft 24 in a first, clockwise direction. The relative positions of the locking surfaces 68 and 84 against each other in the deployed position 72a are also shown in solid and dashed lines in FIGS. 4 and 6. The positioning means 88 are also effective for positioning the brake member 72 in a retracted position designated 72b, as shown in FIG. 3, spaced longitudinally away from the rotor disc 56 for allowing the rotor disc 56 and the shaft 24 to rotate without restraint from the brake member 72.

In the preferred embodiment, the positioning means 88 is effective for resiliently supporting the braking teeth 82 for allowing the rotor teeth inclined surfaces 70 to longitudinally displace the brake member 72 and the braking teeth inclined surfaces 86 to intermittently free the rotor teeth locking surfaces 68 from the braking teeth locking surfaces 84 for allowing the shaft 24 to rotate in a second, counterclockwise direction 15 opposite to the first direction when the brake member 72 is in the deployed position 72a as illustrated in FIG. 8.

More specifically, the positioning means 88 preferably includes a plurality of circumferentially spaced guide holes 90 extending transversely through the outer perimeter of the brake member 72, as shown in more particularity in FIGS. 6 and 7, which guide holes 90 are disposed parallel to the centerline axis 28. A plurality of complementary guide rods 92 are conventionally fixedly joined to the base 50, for example by being formed integrally therewith or being threaded therein, and extend parallel to the shaft centerline axis 28. The guide rods 92 are circumferentially spaced from each other with each guide rod 92 being longitudinally slidably disposed in a respective one of the guide holes 90 for allowing the brake member 72 to translate longitudinally along the guide rods 92 and parallel to the centerline axis 28. The guide rods 92 are also effective for preventing rotational movement of the brake member 72 relative to the shaft centerline axis 28 while allowing longitudinal movement relative thereto.

The positioning means 88 also includes a conventional electromagnet 94 as illustrated in FIGS. 3 and 8 which is spaced from the brake member second surface 80 and fixedly joined to the plurality of guide rods 92 by nuts 96 for example. The electromagnet 94 includes a conventional wire coil 98 electrically connected to the control 44 by the electrical line 46b. The coil 98 is conventionally secured to an annular support plate 100 having a plurality of circumferentially spaced support holes 102 through which are received respective ends of the guide rods 92 for fixedly attaching the support plate 100 thereto using the nuts 96.

A plurality of compression springs 104 as illustrated in FIGS. 3 and 8 are disposed around respective ones of the guide rods 92 and preferably between the electromagnet support plate 100 and the brake member second surface 80 for providing a deploying force on and preferably against the brake member 72 for positioning the brake member 72 in the deployed position 72a against the rotor disc 56 as illustrated in FIG. 8 when the electromagnet 94 is de-energized.

More specifically, the compression springs 104 are disposed between the electromagnet support plate 100 and the brake member second surface 80 and are predeterminedly initially compressed for providing the deploying force against the brake member 72. The electromagnet 94 is conventionally sized for being effective for magnetically attracting the brake member 72, which is formed from a conventional magnetic material, for overcoming the deploying force and further compressing the springs 104 for positioning the brake member 72 in the retracted position 72b as illustrated in FIG. 3 when the electromagnet 94 is energized. When the electromagnet 94 is de-energized, the springs 104 exert the deploying force against the brake member 72 which positions the brake member 72 in the deployed position 72a.

Accordingly, the brake assembly 48 in accordance with the preferred embodiment, provides complementary sawtooth profiled rotor and brake teeth 62 and 82 which are effective for locking the shaft 24 and preventing rotation in preferably one direction, e.g. clockwise direction only when the electromagnet 94 is de-energized. This positive locking of the shaft 24 prevents rotation of the shaft 24 in a clockwise direction for preventing inadvertent withdrawal of the control rod 40 under the back flow occurrence, for example. When the electromagnet 94 is energized, the brake member 72 is retracted from the rotor disc 56 allowing the shaft 24 to rotate and then the motor 42 may be conventionally operated for predeterminedly either inserting or withdrawing the control rod 40.

An additional advantage of the preferred positioning means 88 and teeth 62 and 82 allows for rotation of the shaft 24 in the counterclockwise direction even when the electromagnet 94 is de-energized and the brake member 72 is disposed in the deployed position 72a as illustrated in FIG. 8. In this mode of operation, the motor 42 may be predeterminedly actuated for further inserting the control rod 40 into the vessel 10 even while the brake member 72 is in the deployed position 72b. As illustrated in FIG. 8, the shaft 24 will be turned by the motor 42 in the counterclockwise direction causing the rotor teeth inclined surfaces 70 to longitudinally displace downward the braking teeth inclined surfaces 86, and thereby the brake member 72, by a camming action in a ratcheting fashion for intermittently freeing the rotor teeth locking surfaces 68 from the braking teeth locking surfaces 84 for allowing counterclockwise rotation of the shaft 24.

The position of the brake member 72, initially in the deployed position 72a, due to this ratcheting action is designated 72c and is shown in dashed line in FIG. 8. In this mode of operation, the brake member 72 is initially in the deployed position 72a and is then urged downwardly away from the rotor disc 56 by the rotor teeth 62 until the ratcheting deployed position 72c is reached at the longitudinal extent of travel of the brake member 72 due to the height of the locking surface 68. At this time, the rotor teeth 62 are displaced one rotor tooth position relative to the braking teeth 82 with a respective rotor tooth inclined surface 70 then facing the next succeeding braking tooth inclined surface 86 with a corresponding upward movement of the brake member 72 toward the rotor disc 56 by the springs 104. If the shaft 24 continues to rotate in the counterclockwise direction, the rotor teeth inclined surfaces 70 will then again urge respective braking teeth inclined surfaces 86 downward until the rotor teeth 62 again ratchet one tooth relative to the braking teeth 82. Accordingly, the rotor teeth locking surfaces 68 are intermittently freed from the braking teeth locking surfaces 84 as the shaft 24 rotates counterclockwise with the brake member 72 disposed in the deployed position 72a.

The brake assembly 48 as described above thus provides a positive lock of the shaft 24 to prevent unintentional ejection travel of the control rod 40 from the vessel 10 while allowing for both insertion of the control rod 40 while the brake member 72 is disposed in the deployed position and allowing for relatively simple testing of the brake assembly 48.

More specifically, the brake assembly 48 may be simply tested by de-energizing the electromagnet 94 for positioning the brake member 72 in the deployed position 72a and then energizing the motor 42 to allow the rotor teeth locking surfaces 68 to abut against, and be circumferentially restrained by the braking teeth locking surfaces 84 for preventing further rotation of the shaft 24. Since the motor 42 will be unable to rotate the shaft 24 relative to the brake member 72 in a clockwise direction, the motor 42 will stall, which may be conventionally observed by the control 44 for indicating the effective operation of the brake assembly 48. If the brake assembly 48 is unable to prevent the clockwise rotation of the shaft 24 during testing, the control 44 can provide a suitable indication thereof, which may then result in manual inspection of the brake assembly 48 for correcting any problem that might exist.

Accordingly, the above described brake assembly 48 in accordance with the present invention provides a positive, unidirectional restraint which locks the shaft 24 from unintentional rotation in a predetermined direction which provides an improvement over a conventional friction-type brake which may allow for slippage.

Furthermore, the brake assembly 48 may be tested remotely as described above so that access to the environment adjacent to the nuclear reactor vessel 10 is not required. Yet further, the brake assembly 48 may be tested relatively quickly during normal operation of the reactor vessel 10 without requiring down time of the reactor solely for testing purposes.

While there has been described herein what is considered to be a preferred embodiment of the present invention, other modifications of the invention shall be apparent to those skilled in the art from the teachings herein, and it is, therefore, desired to be secured in the appended claims all such modifications as fall within the true spirit and scope of the invention.

More specifically, and for example, although the rotor and braking teeth 62 and 82 are shown in the preferred embodiment as extending from the respective first surfaces 64 and 78 of the rotor disc 56 and the brake member 72, respectively, other configurations of the teeth 62, 82 may be used in accordance with the present invention. For example, the rotor teeth 62 in an alternate embodiment may extend radially outwardly around the outer perimeter of the rotor disc 56 with the braking teeth 82 extending radially inwardly from an inner annulus of a brake member surrounding the rotor disc 56. Suitable positioning means 88 could be used in such an embodiment for positioning the braking teeth in deployed and retracted positions for locking and unlocking the shaft 24 for obtaining unidirectional restraint.

Accordingly, what is desired to be secured by Letters Patent of the United States is the invention as defined and differentiated in the following claims:

We claim:

1. A brake assembly for a control rod drive for selectively preventing travel of a control rod in a nuclear reactor vessel comprising:
   a shaft having a longitudinal centerline axis;
   means for translating said control rod upon rotation of said shaft;
   means for selectively rotating said shaft in a first direction and in a second direction, opposite to said first direction;
   a stationary base having a central aperture receiving said shaft;
   a rotor disc fixedly connected to said shaft for rotation therewith and having at least one rotor tooth extending therefrom, said rotor tooth having a locking surface and an inclined surface extending therefrom;
   a brake member disposed adjacent to said rotor disc and having at least one braking tooth having a locking surface and an inclined surface extending therefrom, said rotor tooth and said braking tooth being complementary to each other;
   said brake member further including an annular base having a central aperture receiving said shaft, a first surface facing said rotor disc, and a second surface facing away from said rotor disc, and said braking tooth being disposed on said base first surface with said locking surface extending outwardly therefrom and in a radial direction relative to said shaft centerline axis, and with said inclined surface extending in a circumferential direction;
   means for selectively positioning said brake member in a deployed position abutting said rotor disc for allowing said braking tooth locking surface to contact said rotor tooth locking surface for preventing rotation of said shaft in a first direction, and in a retracted position spaced away from said rotor disc for allowing said rotor disc and said shaft to rotate without restraint from said brake member;
   said positioning means being effective for resiliently supporting said braking tooth for allowing said rotor tooth inclined surface to displace said braking tooth inclined surface to intermittently free said rotor tooth locking surface from said braking tooth locking surface for allowing said shaft to rotate in said second direction opposite to said first direction when said brake member is in said deployed position; and
   said positioning means comprising:
      a plurality of circumferentially spaced guide holes in said brake member;
      a plurality of guide rods fixedly joined to said stationary base and extending parallel to said shaft centerline axis, each guide rod being slidably disposed in a respective one of said guide holes;
      an electromagnet spaced from said braking member second surface and fixedly joined to said plurality of guide rods;
      a plurality of springs disposed around said guide rods for providing a deploying force on said brake member for positioning said brake member in said deployed position against said rotor sic; and
      wherein said guide rods are effective for preventing rotational movement of said brake member relative to said shaft centerline axis and for allowing longitudinal movement relative thereto.

2. A brake assembly according to claim 1 wherein:
   said springs are compression springs disposed between said electromagnet and said brake member second surface being initially compressed for providing said deploying force against said brake member;
   said electromagnet is effective for magnetically attracting said brake member for overcoming said deploying force and positioning said brake member in said retracted position when energized, and when de-energized allowing said brake member to be positioned in said deployed position by said compression springs.

3. A brake assembly according to claim 2 further comprising a plurality of said rotor teeth extending circumferentially around said rotor disc and a respective plurality of said braking teeth extending circumferentially around said brake member.

* * * * *